F. THOMAS.
COASTER.
APPLICATION FILED FEB. 1, 1919.
1,327,123. Patented Jan. 6, 1920.
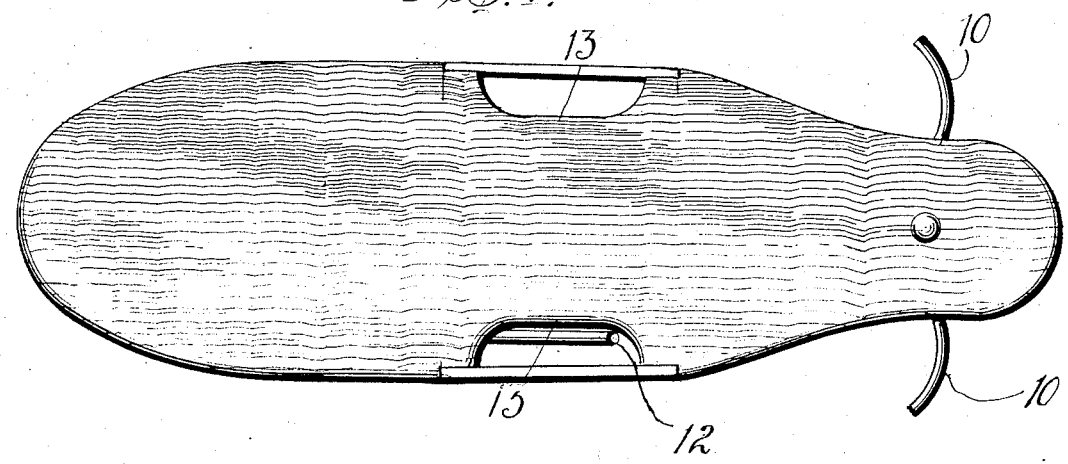
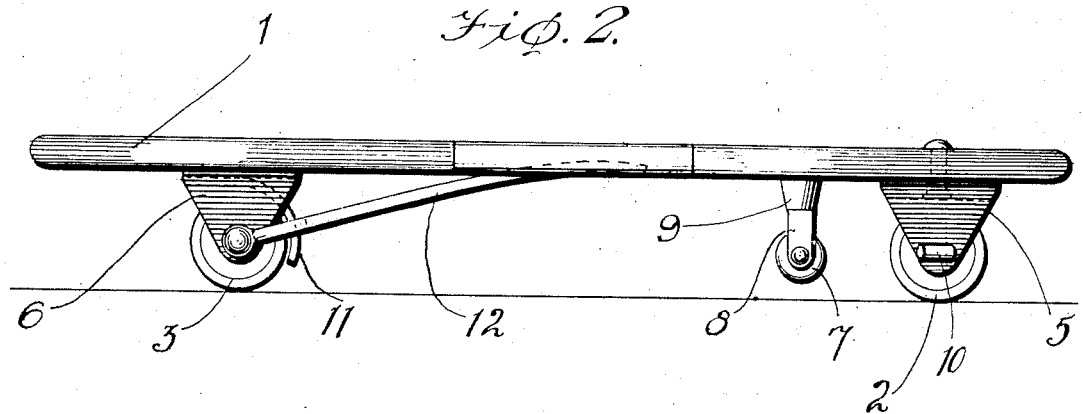
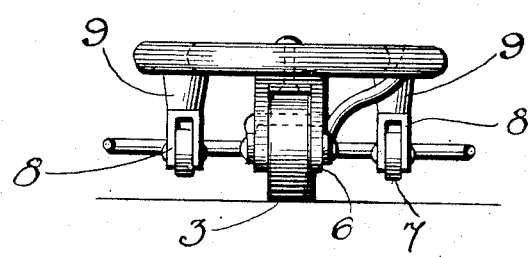
WITNESSES
R. E. Rousseau
INVENTOR
Fred. Thomas,
BY Munn & Co.
ATTORNEYS

UNITED STATES PATENT OFFICE.

FRED THOMAS, OF ROANOKE, VIRGINIA.

COASTER.

1,327,123.  Specification of Letters Patent.  Patented Jan. 6, 1920.

Application filed February 1, 1919. Serial No. 274,407.

*To all whom it may concern:*

Be it known that I, FRED THOMAS, a citizen of the United States, and a resident of Roanoke, in the county of Roanoke and State of Virginia, have made certain new and useful Improvements in Coasters, of which the following is a specification.

My invention is an improvement in coasters, and has for its object to provide a simple, inexpensive device of the character specified, which may be manufactured at a low cost, and which will be strong, and efficient for the purpose.

In the drawing:—

Figure 1 is a top plan view of the improved coaster;

Fig. 2 is a side view;

Fig. 3 is a rear end view.

In the present embodiment of the invention, the improved coaster comprises a body 1 of wood or the like, supported at its ends by front and rear wheels 2 and 3, the said wheels being journaled in substantially U-shaped brackets 5 and 6, the bracket 5 being pivoted to the body while the bracket 6 is secured thereto. Thus by means of mechanism to be presently described connected with the bracket 5, it may be swung to guide the coaster. These wheels 2 and 3 are connected with the body in a line at the center of the body and to prevent overturning, a pair of wheels 7 is arranged just in rear of the wheel 2 and on opposite sides thereof, the said wheels 7 being journaled in substantially U-shaped brackets 8, which are connected by posts 9 to the body.

The bracket 5 has curved arms 10 extending outwardly therefrom, the said arms being continuations of the shaft upon which the wheel 2 is journaled, and these arms are adapted to be engaged by the feet of the rider to swing the bracket 5 to guide the coaster. The wheels 7 will prevent overturning of the coaster engaging the ground when the coaster tilts to support the same, and will also prevent stoppage of the coaster by the brake action of the engagement of the body with the ground.

A brake is provided, the said brake consisting of a shoe 11 curved to correspond with the curve of the rear wheel and arranged above the same and adapted to be forced against the wheel by a lever 12. This lever extends forwardly and upwardly above the upper surface of the body, the body being notched at each side, as shown at 13, and the lever 12 passing through one of the notches, where it will be easily accessible to the rider.

The improved coaster is designed for use on any hard surface suitable for the purpose, and some skill being required to coast on the two wheels by balancing the car, there will be an element of amusement in its use.

I claim:—

A coaster comprising a body in the form of a plate, a pair of wheels journaled in alinement longitudinally of the plate and centrally thereof, one of the wheels being mounted to swing on an axis perpendicular to the plate to guide the coaster, said wheel having laterally extending foot bars for engagement by the feet of the rider to swing the wheel, and relatively fixed auxiliary wheels arranged on the under side of the plate and spaced apart from the central line and normally spaced above the ground and adapted to come into engagement with the ground when the coaster tilts to either side to support the coaster.

FRED THOMAS.

Witnesses:
R. J. ANDERSON,
G. W. NAFF.